United States Patent

[11] 3,633,218

| [72] | Inventor | Robert D. Lekberg |
| | | 4040 W. 123d Street, Alsip, Ill. 60658 |
| [21] | Appl. No. | 66,270 |
| [22] | Filed | Aug. 24, 1970 |
| [45] | Patented | Jan. 11, 1972 |
| | | Continuation-in-part of application Ser. No. 729,774, May 16, 1968, now Patent No. 3,579,646. This application Aug. 24, 1970, Ser. No. 66,270 |

[54] SHIPBOARD RECIRCULATION SEWAGE SYSTEM
12 Claims, 5 Drawing Figs.

[52] U.S. Cl. .................................................. 4/10, 137/578, 210/242
[51] Int. Cl. ...................................................... E03d 1/00, E03d 3/00, E03d 5/00
[50] Field of Search .......................................... 4/10, 90, 89, 115, 18, 12; 137/578; 210/242

[56] References Cited
UNITED STATES PATENTS

| 717,932 | 1/1903 | Scudder | 137/578 X |
| 1,199,851 | 10/1916 | Woolsey | 137/578 X |
| 1,528,003 | 3/1925 | Varnall | 137/578 X |
| 1,644,248 | 10/1927 | Goldman | 210/242 |
| 2,207,378 | 7/1940 | Hinsch | 137/518 |
| 2,296,713 | 9/1942 | Hinsch | 137/578 X |
| 3,079,612 | 3/1963 | Conlis | 4/10 |
| 3,320,621 | 5/1967 | Vita | 4/10 |
| 3,472,390 | 10/1969 | Pall et al. | 4/10 X |
| 3,487,475 | 1/1970 | Minniear | 4/10 |

*Primary Examiner*—Henry K. Artis
*Attorney*—John W. Gaines

ABSTRACT: Recirculation sewage system for shipboard use having a holding tank which enables the toilet flushing liquid to be recycled following removal of sizable particulate matter therefrom in the tank. The discharge from the toilet is received as incoming waste in the tank, wherein the heavier solids settle out from the moving liquid. The liquid moves in the tank through an interposed screen in a path to the inlet of a float-supported swinging suction pipe in the tank. The pipe withdraws, as the toilet flushing water, only from a surface layer and the interposed screen, which can be movable or fixed, screens out other solids from the thus decanted liquid. Screening is by a screen wall fixed in the tank in the liquid path in one embodiment, or by a screen basket carried by the float so as to move with the suction pipe in an interposed position across the inlet.

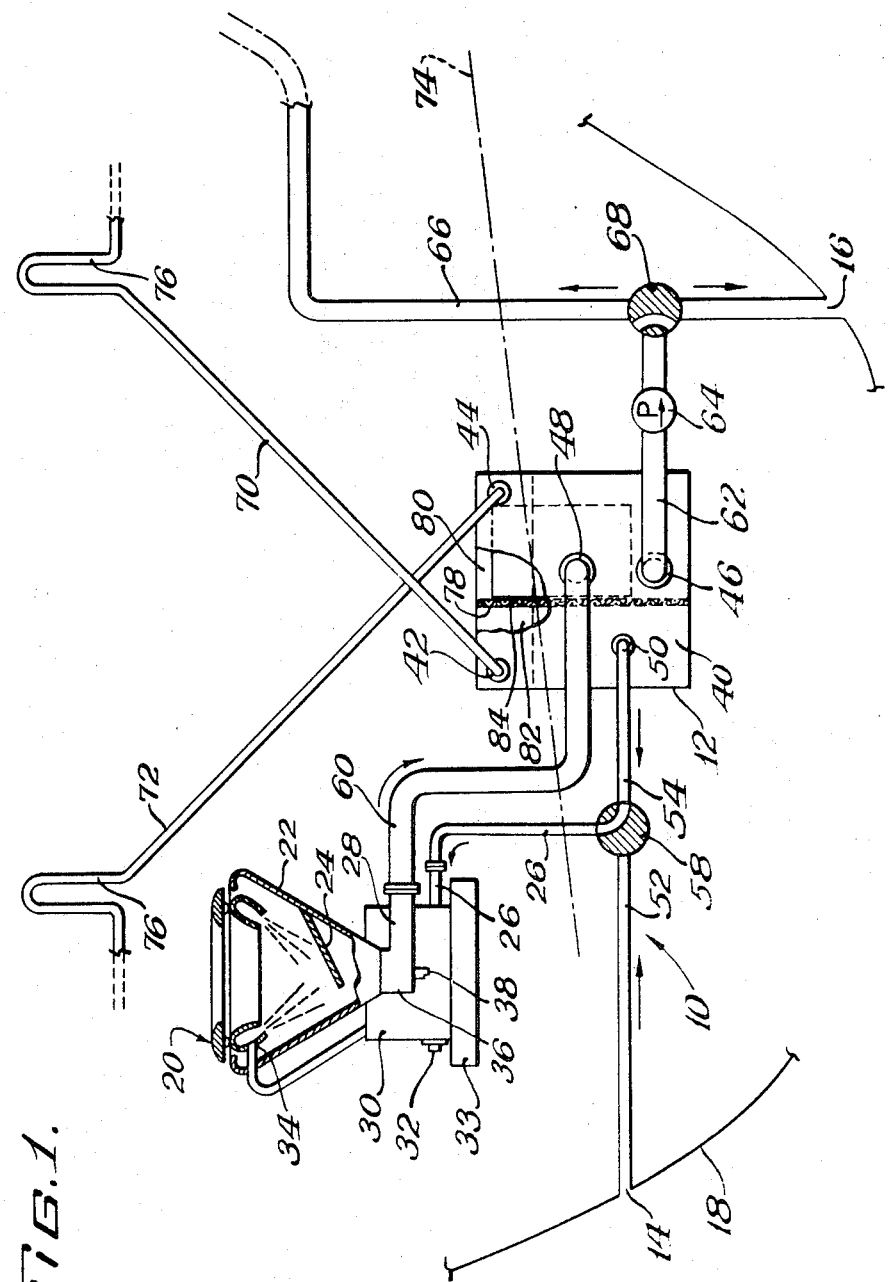

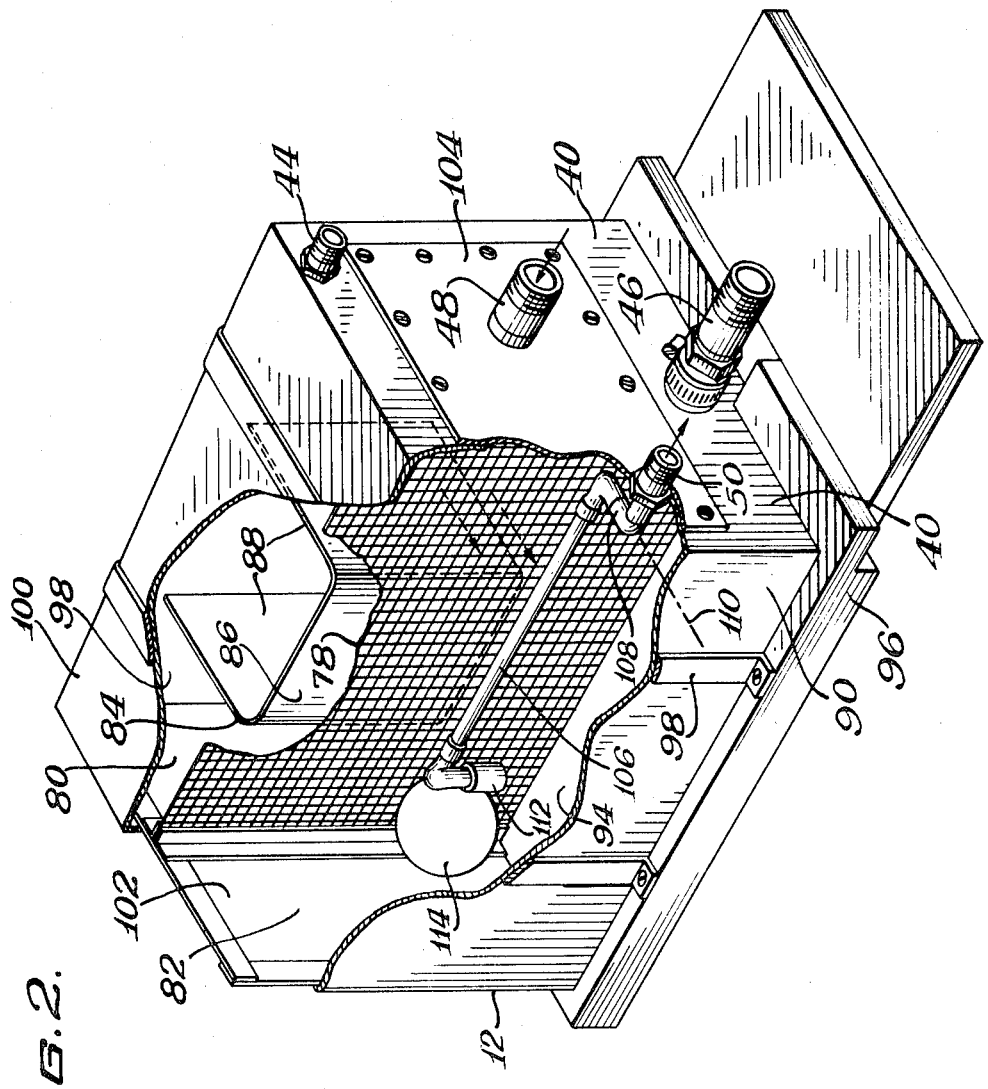

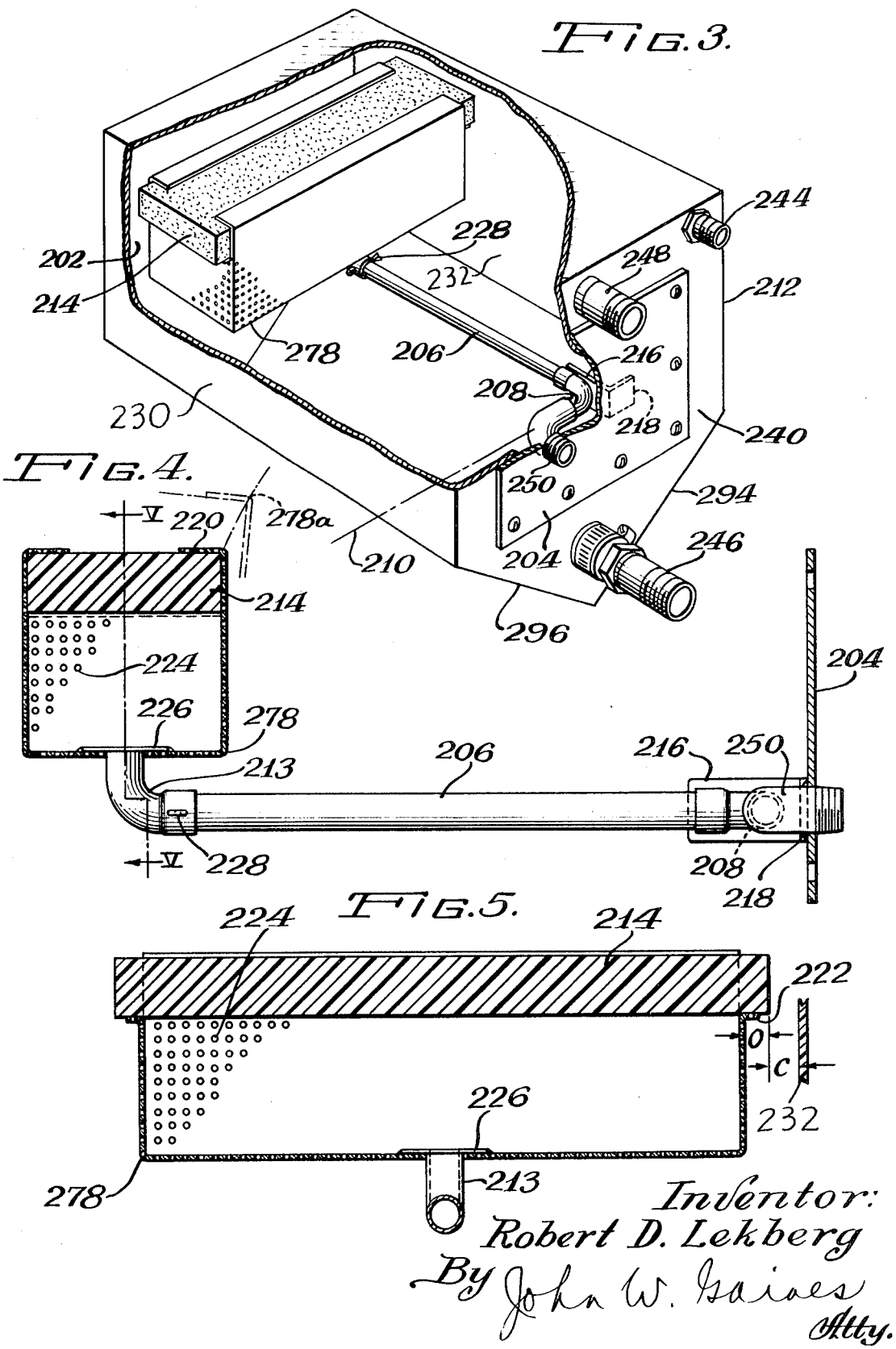

SHIPBOARD RECIRCULATION SEWAGE SYSTEM

The present application is a continuation-in-part of copending Lekberg patent application, Ser. No. 729,774, filed May 16, 1968 now U.S. Pat. No. 3,579,646.

This invention has an ecological improvement purpose, and one of the objects is to reduce polluting water with raw sewage.

Particularly, the invention relates to a shipboard sewage system and, more particularly, to a holding tank provided therein and enabling the system to reuse the contents by recirculating essentially liquids only from the tank. The recirculating tank according to my invention has considerably smaller size and smaller weight to it, as compared to a strict holding tank as conventionally used for various purposes aboard ship.

A difficulty to the owner of a watercraft, especially the small boat owner, is that the disposal of human waste by direct overboard discharge contributes to water pollution. So the owner of the small boat, in which the so-called head of the ship is equipped with a direct overboard discharge from the toilet or toilets, resorts rarely if ever to use of the overboard discharge. It is more and more the practice to hold all sewage aboard. The wastes, particularly human wastes, are disposed of in port, where shoreside pump out facilities are available.

But a strict holding tank has the indicated disadvantages of both large size and weight. A smaller, lighter recirculating tank design for the stringent conditions of shipboard use hitherto has not only the disadvantage of possibly going unnoticed and thereby overfilling, but other disadvantages due to the outside venting which is necessary and due to the complication from ship motion. Ship motion subjects a recirculating holding tank to agitation and unsettling of the solids therein, to surging and internal wave motion therein, to spillage to the outside or to accepting outside splash water attempting to enter the tank, or both, to clogging of the tank outlet while functioning to return flushing medium to the toilet for recirculation, and to plugging and clogging in the system elsewhere.

My invention materially reduces or substantially eliminates the foregoing disadvantages, through provision of an essentially nonspilling, quantity indicating, clogging resistant, recirculating holding tank of a design adapted for retrofit installation in existing equipment or for installation as original equipment, all as will now be described in detail.

Further features, objects, and advantages will either be specifically pointed out or become apparent when, for a better understanding of my invention, reference is made to the following description taken in conjunction with the accompanying drawings, which show a preferred embodiment thereof and in which:

FIG. 1 is a showing, in a view in the direction astern, of a shipboard sewage system embodying the present holding tank invention;

FIG. 2 is a showing of the tank only, viewed as in FIG. 1, but viewed fragmentarily and isometrically to emphasize the tank details;

FIG. 3 is similar to FIG. 2 but shows a modification of the tank, with a float screen and tethering arm; and FIGS. 4 and 5 show the modification of FIG. 3, viewed respectively with the float screen and arm in longitudinal sectional elevation and with the float screen in transverse-sectional elevation.

More particularly in FIG. 1 of the drawings, a shipboard sewage system 10 having a recirculating holding tank 12 is shown connected between a pair of hull openings consisting of the overboard intake 14 and overboard discharge 16 of a vessel 18. The system is primarily adapted for but not necessarily limited to original equipment or retrofit installation on watercraft, e.g., small boats including sailboats which are at least large enough to be equipped with a head.

The boat toilet 20 in the system has a standard construction including the regular bowl 22 and a splash baffle 24 therein, and two side connections consisting of the regular toilet suction 26 and discharge 28. A pump 30 having power means 32 such as a timed switch-operated electric motor or a handle-operated rock shaft is connected in the base 33 of the toilet 20 to draw flushing liquid from the suction 26 and return it through a downspraying flushing ring 34 into the mouth of the bowl 22.

The discharge 28 forms the side arm of a regular macerator 36 having a rotary macerating head driven by a vertically disposed power shaft 38, the operation of which is controlled by a time-delayed stopping switch by which maceration lasts at least coextensively in time with and perhaps continues slightly longer than each flushing cycle.

The tank 12, presently illustrated in a fore and aft extending attitude in the vessel as shown, has a manifold end wall 40 which faces forward. A first vent fitting 42 is in one of the opposite upper corners of the end wall 40 and a second vent fitting 44 is in the other upper corner of the end wall 40. A tank pump out fitting 46 is in the bottom portion of the wall generally on the same side of the tank as the second vent fitting 44.

The wall 40 carries a brass mainfold, not shown, centrally located on the outside, in which manifold an intake fitting 48 is mounted generally on the side with the pump out and the second vent 44, and in which a pickup fitting 50 is mounted on the opposite side of the manifold.

The connections and interconnections in the system are made by pipes and hoses as appropriate. A connecting line 52 leading from the overboard intake 14 and a connecting line 54 leading from the tank pickup 50 form a three way junction with a connecting line 56 to the toilet suction 26, and they supply the latter line 56 with flushing liquid drawn from either the intake or the pickup. A two-way hand valve 58 in the three way junction has a normal position as shown in solid lines in FIG. 1 enabling the toilet to selectively draw from the tank 40, and a preliminary position reached with 90° counterclockwise rotation of the valve which intercommunicates the overboard intake to the toilet suction for initial flushing sufficient to introduce a preliminary charge into the holding tank 40 when restarting the system after the tank has been emptied.

The connections 56 and 54 as provided can consist of small hoses equipped with suitable couplings at the ends, and a connection 60 between the toilet discharge 28 and the tank inlet fitting 48 can be made by means of a large diameter hose.

A connection 62 which can include a pump 64 interconnects the tank pump out fitting 46 and the overboard discharge 16 and provides a forced clean out connection for the system. A line 66 for dockside attachment is connected to the clean out connection to form a second three way junction into which a two-way, three-position hand valve 68 is connected. The valve is shown in a solid line-blocking position, from which it is selectively movable clockwise as viewed in FIG. 1 to intercommunicate the tank pump out to the line 66 or movable counterclockwise to intercommunicate the tank pump out to the overboard discharge 16. The line 66 leads upwardly to a waste deck fitting, which is flush mounted topside in the vessel for periodic tank clean out use whereby the waste is pumped out into storage facilities on shore. The valve connection to the overboard discharge 16 is opened only under exceptional circumstances because the general practice is to meticulously avoid polluting the water with raw sewage.

A vent fitting extension 70 leads from an external venting point, not shown, on the port side of the vessel as illustrated diagonally down to that vent fitting 42 which is on the opposite side of the tank 40. A complementary vent fitting extension 72 leads from an external venting point on the starboard side of the vessel as illustrated diagonally down to the second vent fitting 44 on the more remote or opposite side of the recirculating holding tank 40.

In the assumed case wherein the vessel 18 rolls for example to port, causing it to take the angled attitude shown with respect to the always horizontal waterline 74, it will be appreciated that as the vent extension 70 on the port side lowers closer to the waterline the first vent fitting 42 separates farther above the surface of the liquid in the tank 40. At the same time, the vent extension 72 on the starboard side rises to a nearly more vertical position as the surface of the liquid in the tank 40 moves closer to the second vent fitting 44. As a consequence, the tank 40 is a nonspilling tank especially suitable for stringent conditions of sailboat use and insuring venting in the normal attitude of roll. That is to say, the vent extension at the side of the vessel which transitorily dips is connected to the vent fitting at the highest point in the tank, and so the vent fitting cannot allow the tank to spill because the fitting is not immersed in the tank liquid. The vent fitting which transitorily tends to become immersed in tank liquid is connected to the vent extension attaining a more acute vertical angle, and so the vent extension cannot allow the tank liquid to spill because the extension has a near vertical attitude above the tank.

As a precaution against flow the other way, i.e., taking on water through the vents so as to flood the tank 40, each vent extension at the upper end is formed with a half-loop of inverted U-shape 76. The external venting points of the extensions 70 and 72 can be made through hull fittings fixed in opposite sides of the vessel 18 above the waterline, and each half-loop because of its inversion prevents outside splash water from entering the tank 40 through the associated vent extension.

EXAMPLE OF TANK WITH FIXED SCREEN

As shown in FIGS. 1 and 2, the tank 40 has a longitudinally extending vertical baffle screen 78 therein dividing the interior into a receiving chamber part 80 and a pickup chamber part 82. Secured to the receiving chamber side thereof, the screen 78 carries a wave-counteracting baffle 84 of U-shaped impervious construction. The baffle 84 comprises a vertical attachment base 86 which is transversely disposed to the manifold wall 40 and two parallel vertical leg panels 88 which are disposed transversely between the two sidewalls 90 and 92 of the tank on the sides adjacent the first and second fittings 42 and 44, respectively.

The tank 40 includes a bottom wall 94, on which the tank is supported by means of a fore- and aft-extending mounting tray 96 preferably made of wood. A set of holddown strap 98 is trained over the tank so as to pass over the top wall 100 thereof, and is secured by screws to the tray 96.

The tank further includes a rear wall 102, and a centered brass manifold plate 104 secured fluidtight to the front wall 40 by means of screws. The intake and pickup fittings 48 and 50 are fixed in the brass plate and the intake fitting 48 registers with and extends into the receiving chamber part 80 of the tank.

The pickup fitting 50 cooperates with the pickup chamber part, and a rigid straight pickup arm 106 forms an internal extension of the fitting to function as a suction pipe. The pickup arm 106 has a transverse portion 108 including a rotary joint made of interfitting relatively rotatable sleeves which are carried by the fitting 50 and which define a horizontal pivot axis 110 at the fixed end of the arm.

The arm 106 has a free outer end including a downturned mouth extension 112 which carries a hollow float ball 114. The float ball 114 causes the pickup arm inlet formed by the mouth extension 112 to follow the liquid level in the tank. But the level is followed with the inlet at a point at all times slightly below the surface, e.g., immersed at a distance about 2 inches therebelow. Therefore, only the supernatent liquid is picked up, and it is drawn out of the tank from the pickup fitting 50 in the direction indicated by an arrow in FIG. 2.

The receiving chamber part 80 receives the toilet discharge through the fitting 48 in the direction indicated by an arrow. The tank is preferably made of white translucent polyethylene plastic. The impervious baffle 84 is preferably made of bent, one-piece copper plate and the plate counteracts wave motion both longitudinally and transversely in the tank.

One of the critical components of the tank 40 is the dividing baffle screen 78, which is sized to have a minimum area of 10 square inches per gallon capacity of the tank and preferably has about 24 square inches per gallon. More specifically, in an 8-gallon tank, which is the one illustrated in FIG. 2, the baffle preferably should have about 190 square inches of area. Roll of the ship causes tank liquid to wash through the screen in alternate directions imparting a self-cleaning action thereto.

After the tank 40 has been emptied during one of the cleanout and charge-fill cycles previously described, it is desirable occasionally during such a cycle to disconnect the vent extension 70 and introduce the preliminary charge to the tank through the fitting 42 so as to positively reverse flush through the screen 78.

If the fixed wall formed by the screen 78, or if both the fixed screen wall and the fixed baffle 84 are eliminated from the tank, a float screen can be substituted so as to fit over the pipe inlet on the pickup arm although such substitution adds to the number of, and complications in, the moving parts in the system. With particular reference, however, to the fixed screen, the float screen because of floating offers the advantage of keeping cleaner, and it offers the further advantage of taking over the wave-counteracting function for which the baffle 84 would otherwise be deemed desirable or necessary for keeping particulate matter settled out. The float screen especially effectively counteracts longitudinal sloshing in the tank resulting from pitching of the ship, and is indeed generally effective in its floating motion function, as will now be explained in connection with the particular movable screen embodiment following.

MOVABLE SCREEN EXAMPLE —FIGURES 3, 4, AND 5

Reference numerals are used corresponding to the preceding embodiment, but differentiated in this float screen embodiment generally by a prefix, mostly by a 2 in the hundreds' place. The numerals and parts are:

| | |
|---|---|
| Rear wall 202 | Centered plate 204 |
| Rigid pickup arm 206 | Transverse arm portion 208 |
| Horizontal pivot axis 210 | V-bottom tank 212 |
| Upsturned mouth extens. 213 | Slab float 214 |
| Front end wall 240 | Second vent fitting 244 |
| Pumpout fitting 246 | Intake fitting 248 |
| Pickup fitting 250 | Transverse float screen 278 |
| Sloping V-side 294 | Sloping V-side 296 |

A straight length of copper tube serves as the pickup pipe or arm 206, and its attached end which is in the forward direction carries a small 90° elbow. Flexible hose, if used at that point, will afford a slightly shifting swing connection axis at the point if so desired. But as shown, however, a fixed swing axis is provided and the pickup fitting 250 is a large 90° elbow with one end telescoped over an adjacent end of the small 90° elbow, to form a pivot joint in the transverse arm portion 208.

As the arm 206 swings up and down about a fixed horizontal pivot axis 210 defined by the elbow joint, the adjacent end of the smaller elbow rotates in the elbow end telescoped thereover and thus journals the arm 206 on the transverse portion 208. A blocking bend tab 216 keeps the arm 206 in a vertical plane by preventing the elbows from separating. But when separation is required for servicing, the blocking tab 216 is temporarily bent laterally and forwardly about a tab attachment foot 218, and it thus liberates the smaller elbow to be telescoped free from the elbow or pickup fitting 250 on the centered brass manifold plate 204.

The transverse float screen 278 is in the form of a generally rectangular basket having five of its six sides made of perforated metal, such as perforate copper alloy sheet. The top sidewall is the sixth side, and is formed by the slab float 214 which has a generally rectangular face and is imperforate and comparatively thin in the thickness dimension.

Along its upper face, the slab float 214 is clamped down along its longitudinal edges by means of short inturned flanges 220 (FIG. 4) on the top of the sidewalls of the basket. On its lower face, the slab float 214 is clamped against on its end portions by means of short out-turned flanges 222 (FIG. 5) on the top of the end walls of the basket. The resulting grip causes the yieldable float material to have a slight compressive deformation, not shown, fixing the slab float securely against twist or longitudinal slip in the basket.

The effective area provided, i.e., the metal face area with unblocked perforations 224, is at least 10 square inches per gallon of tank capacity. The hole diameter of the perforations is a fraction of an inch, and the holes are on centers a fraction of an inch apart, e.g., two diameters center-to-center.

The upturned mouth extension 213 is a 90° elbow with the vertical leg thereof lodged in a bottom opening of the basket bottom wall and carrying a large circular inside flange 226. The flange is a ring with the edges bonded to the adjacent bottom wall, and the open center defines the pickup arm inlet. The horizontal leg of the extension 213 is telescoped over the free end of the tube forming the pickup arm 206, and a transverse cotter pin 228 detachably secures the leg and tube together.

About an inch gap is provided between each end of the float screen on the basket 278 and the tank sidewall 230 or 232 at that end. Thus, in an 8-gallon capacity tank 212 having an inside dimension of, say, 12½ inch from side-to-side, the length of the basket will be about 10½ inch. Into each end gap, an end portion of the slab float 214 projects about halfway. In the example of FIG. 5, the typical float end portion shown on the port side has an overhang $o$ which can be about one-half inch beyond the corresponding end of the screen basket. In basket-centered position, the same end portion provides a clearance $c$ which can be about one-half inch where it terminates short of the adjacent wall 232.

The material of each of the tank and slab float is a plastic.

Specifically, the tank material is translucent white polyethylene plastic. The float material used is a low density closed cellular expanded plastic, for which use styrofoam, urethane, propylene, and polyethylene are each one satisfactory, and the polyethylene is the preferred slab.

MOVABLE SCREEN OPERATION

In operation, the float screen 278 floats upon the liquid, and is so constructed and proportioned that the pickup arm inlet draws from the surface layer at about 2 inches below the liquid surface. The slab float and rigid pickup arm constrain the float screen to up and down movement essentially at right angles to wave disturbances occurring in the liquid. The nearness of the tank sidewalls makes them available as guides for the slab float, and instances arise when the overhang of the plastic material of the float rides against the adjacent sidewalls. The wet plastic interface affords lubricated gliding contact, and critically intervenes to prevent the soft plastic from being rubbed, scratched, and worn through by perforated metal sides, edges, and corners on the comparatively abrasive screen basket.

The porous float screen 212 intervenes in the rear of the tank in the path of fore and aft wave motion arising from ship pitch. For several reasons which have come to light, the main longitudinal wave is separated into lagging and leading components by the screen. So there is no peak to the main wave as such, and the components peak out of phase with one another rather than algebraically adding in phase to build to a major disturbance. The float screen also intervenes in the path of transverse waves, such waves being due to ship roll and travelling the comparatively short distance from side-to-side in the tank.

Obviously, the force of a main wave is reduced by the portion thereof delayed by breaking on the slab float 214. So although the longitudinal waves are afforded travel for the entire length of the tank, they are met broadside by the float screen, with a consequent reduction in amplitude and reduction in the stirring and churning effect.

The inertia of the porous metal basket and its water contents causes the float as it bobs to be out of exact phase with the waves. The water level in the screen basket is temporarily raised by a passing wave, but the resulting water temporarily added by the wave is later released with a dashpot-type delay from the porous basket. The part thus released from the volume of the main wave is behind it in time and distance, and peaks later so that the force of the main wave is proportionally reduced. Such reduction is manifest generally, and specifically along both transverse surface axes, i.e., the mutually perpendicular axes of wave motion widthwise and lengthwise of the tank, to limit churning and unsettling of the contents in the latter.

In the preceding embodiments of the invention, the starting level of the liquid in the tank is about one-third of the way up, and the location of the transverse pickup arm portion and pickup fitting is slightly therebelow for immersion to produce suction.

Separation of the waste so that primarily liquid will be recirculated is accomplished in large measure right upon entry into the tank, in which heavier solids forthwith settle out of the incoming waste. The fixed screen wall, or the float screen, or both as the case may be, thereafter screen out many other solids. Finally, the floating pickup arm inlet functions to allow only liquid from down in a surface layer to be drawn from the tank for recirculation. Floating scum, if any, remains undisturbed on the surface.

Overfilling of the tank of these embodiments from continued usage is readily avoided. The translucent material thereof makes manifest the capacity and condition of the tank, which can be inspected at a glance and emptied when the quantity of contents held makes pump out necessary.

In case the valve 58, from the solid line position shown in FIG. 1, is rotated and left in a 90° counterclockwise position therefrom, the tank in the sewage system will function solely as a holding tank, in which case only about 25 percent as many toilet uses can be accomplished before the tank is full. When the tank thus serves strictly as a holding tank, no chemical additives are necessary or desirable, such as chemical deodorant added to the tank contents.

However, when the tank is being used for recirculation, an odorizing colorant of conventional chemical toilet composition or the like is added in the amount of about 2 ounces to the gallon of starting volume. Also, about 2 more ounces of the odorizing colorant per gallon of liquid present are added to the system when the tank is about three-quarters full. Between the time at which a tank of convenient size, for instance, an 8-gallon tank, is first filled to the starting level (e.g., where it holds about 3 gallons) and the time by which it has accumulated waste sufficient to fill the tank, such 8-gallon recirculating tank will have accommodated from about 70 to 100 uses of the toilet in the system.

There is no danger any time in employing either vent fitting for admitting therethrough the starting charge into the tank, because the other vent will be effective at the time to relieve pressure in the tank and prevent bursting.

The embodiments of the invention in which an exclusive property or privilege is claimed are defined as follows:

1. For use with a shipboard toilet, for holding human waste accumulating therein from the toilet and for recirculating to the toilet primarily liquid screened and decanted from such waste:
    a marine holding tank arranged with means of connection to the toilet at a point in the tank for accepting the waste accumulating from the toilet, plus a connection having an internal extension from a point in the tank for the pickup liquid to be decanted, screened, and recirculated as described;
    the internal extension of the last-named connection comprising a pickup tube having an end attached to a wall of the tank, and having a free end; and
    a float screen secured to the pickup tube at the free end thereof whereby the latter will, by swinging the pickup tube about the attached end thereof, follow and draw only screened liquid from, and draw only from a surface layer of liquid in, the marine holding tank.

2. The invention of claim 1, the amount of free screen on said float screen and the internal dimensions of said tank constructed, proportioned, and arranged to insure at least about:
    ten square inches of effective screening area per gallon of tank capacity.

3. The invention of claim 2, characterized by:

the tank formed of translucent material whereby the liquid level is manifest from a visual inspection;

the screen being float-supported by flotation material.

4. The invention of claim 3, further characterized by:

the translucent and flotation materials each being a plastic.

5. The invention of claim 2, characterized by:

the float screen being float supported by a body of closed cellular expended polymer.

6. The invention of claim 1, characterized by:

the pickup arm and float screen constraining one another during ship motion to rise and fall in unison as an assembly generally at right angles to and interposed in the surface wave path, such assembly breaking each main surface wave into a plurality of leading and lagging components in the tank which peak out of phase.

7. The invention of claim 6, further characterized by:

the float screen disposed so as to be always broadside to tank surface waves moving along one transverse axis in the tank, thus causing that component of a main wave which breaks over the float screen to lag behind the main wave and to peak later.

8. The invention of claim 7, further characterized by:

the float screen generally paralleling tank surface waves moving along the other transverse axis, retaining in the screening a wave part from the volume of a main wave and releasing same behind the main wave, as a component part lagging behind the main wave and peaking later.

9. Float-supported pickup structure for a marine sewage holding tank, and the like, for use in decanting liquids from the tank contents such as from human wastes to be so decanted from, comprising:

a hollow pickup arm having a free end which pickup arm is swingable at its free end, up and down about a secured end provided thereon and providing means of securement to an arm swing connection on the tank;

a generally rectangular screen basket with an opening provided in a first side thereof;

a connection between the hollow pickup arm and the screen basket, interconnecting the basket opening and the arm free end; and a slab float of expanded cellular plastic, generally in the plane of, and secured to, one side of the screen basket, said float being on a different side from the side with the opening.

10. The invention of claim 9, the slab float characterized by a closure member forming the top side of the screen basket and closing off same thereat.

11. The invention of claim 9, characterized by:

said one side constituting the top side of the screen basket, the buoyancy of the slab float and its distance from the basket opening immersed therebelow so related and arranged that the free end of the pickup arm draws liquid at a distance maintained substantially constantly at about 2 inches below the liquid surface.

12. The invention of claim 9, the one side characterized by a lengthwise extending side of the basket, the plastic slab float at each end extending beyond the corresponding end of the screen basket.

* * * * *